(12) United States Patent
Cheng et al.

(10) Patent No.: US 11,907,603 B2
(45) Date of Patent: Feb. 20, 2024

(54) SCREEN PROJECTION CONTROL METHOD AND ELECTRONIC DEVICE

(71) Applicant: Lenovo (Beijing) Limited, Beijing (CN)

(72) Inventors: Tao Cheng, Beijing (CN); Xiaoyan Shi, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 13 days.

(21) Appl. No.: 17/550,672

(22) Filed: Dec. 14, 2021

(65) Prior Publication Data
US 2022/0317966 A1 Oct. 6, 2022

(30) Foreign Application Priority Data
Mar. 30, 2021 (CN) .......................... 202110341041.7

(51) Int. Cl.
*G06F 3/14* (2006.01)
*G06F 13/42* (2006.01)

(52) U.S. Cl.
CPC ........ *G06F 3/1454* (2013.01); *G06F 13/4282* (2013.01); *G06F 2213/0042* (2013.01)

(58) Field of Classification Search
CPC .. G06F 3/14; G06F 3/1454; G06F 2213/0042; G09G 5/14; G09G 2370/20; G09G 2370/16; H04W 76/00; H04N 21/41407; H04N 21/4143
See application file for complete search history.

(56) References Cited

U.S. PATENT DOCUMENTS

| | | | |
|---|---|---|---|
| 2011/0019623 A1* | 1/2011 | Funabiki | H04N 21/4122 370/328 |
| 2014/0282693 A1* | 9/2014 | Soundararajan | H04N 21/812 725/32 |
| 2015/0180699 A1* | 6/2015 | Zhao | H04L 47/00 370/329 |
| 2021/0173609 A1* | 6/2021 | Liu | G06F 3/0488 |
| 2022/0224968 A1* | 7/2022 | Wang | H04N 21/4788 |
| 2022/0295027 A1* | 9/2022 | Wang | H04N 21/41407 |

FOREIGN PATENT DOCUMENTS

| | | |
|---|---|---|
| CN | 103580966 A | 2/2014 |
| CN | 109819493 A | 5/2019 |
| CN | 110381345 A | 10/2019 |

\* cited by examiner

*Primary Examiner* — Priyank J Shah
(74) *Attorney, Agent, or Firm* — ANOVA LAW GROUP, PLLC (57) ABSTRACT

A screen projection control method and an electronic device are provided. The screen projection control method includes detecting that a first electronic device and a second electronic device are connected with each other through a physical bus and confirming screen projection reference parameters based on the second electronic device and the physical bus; establishing a network link between the first electronic device and the second electronic device; obtaining multimedia data to-be-outputted by an output unit of the first electronic device; and transmitting the multimedia data to the second electronic device using the network link based on the screen projection reference parameters to allow the second electronic device to output the multimedia data.

20 Claims, 4 Drawing Sheets

SCREEN PROJECTION CONTROL METHOD AND ELECTRONIC DEVICE

CROSS-REFERENCE TO RELATED APPLICATION

This application claims the priority of Chinese Patent Application No. 202110341041.7, filed on Mar. 30, 2021, the content of which is incorporated herein by reference in its entirety.

TECHNICAL FIELD

The present disclosure generally relates to the field of data processing technology, and, more particularly, relates to method and apparatus screen projection control and an electronic device.

BACKGROUND

Screen projection refers to displaying pictures displayed on the display screen of one electronic device onto the display screen of another electronic device. For example, the display screen on the mobile phone can be projected onto the display screen of a TV or computer.

To realize the screen projection, a user needs to input relevant parameters required for screen projection and complete a series of configuration operations on the electronic device on which pictures are to be displayed, and then the screen projection channel from one electronic device to another electronic device can be established. This generates high complexity of the projection screen.

SUMMARY

One aspect of the present disclosure provides a screen projection control method. The method includes detecting that a first electronic device and a second electronic device are connected with each other through a physical bus and confirming screen projection reference parameters based on the second electronic device and the physical bus; establishing a network link between the first electronic device and the second electronic device; obtaining multimedia data to-be-outputted by an output unit of the first electronic device; and transmitting the multimedia data to the second electronic device using the network link based on the screen projection reference parameters to allow the second electronic device to output the multimedia data.

Another aspect of the present disclosure provides a screen projection control apparatus. The apparatus includes a first determination module, configured to detect that a first electronic device and a second electronic device are connected with each other through a physical bus and confirm screen projection reference parameters based on the second electronic device and the physical bus; an establishment module, configured to establish a network link between the first electronic device and the second electronic device; a first obtaining module, configured to obtain multimedia data to-be-outputted by an output unit of the first electronic device; and a first transmission module, configured to transmit the multimedia data to the second electronic device using the network link based on the screen projection reference parameters, where the second electronic device outputs the multimedia data.

Another aspect of the present disclosure provides an electronic device. The electronic device includes a memory, configured to store program instructions for performing a screen projection control method; and a processor, coupled with the memory and, when executing the program instructions, configured for: detecting that a first electronic device and a second electronic device are connected with each other through a physical bus and confirming screen projection reference parameters based on the second electronic device and the physical bus; establishing a network link between the first electronic device and the second electronic device; obtaining multimedia data to-be-outputted by an output unit of the first electronic device; and transmitting the multimedia data to the second electronic device using the network link based on the screen projection reference parameters to allow the second electronic device to output the multimedia data.

Another aspect of the present disclosure provides a non-transitory computer-readable storage medium, containing computer program for, when executed by a processor, performing a screen projection control method. The method includes detecting that a first electronic device and a second electronic device are connected with each other through a physical bus and confirming screen projection reference parameters based on the second electronic device and the physical bus; establishing a network link between the first electronic device and the second electronic device; obtaining multimedia data to-be-outputted by an output unit of the first electronic device; and transmitting the multimedia data to the second electronic device using the network link based on the screen projection reference parameters to allow the second electronic device to output the multimedia data.

Another aspect of the present disclosure provides a computer program product, which can be directly loaded into the internal memory of the computer, such as the memory included in the electronic device, and contain software code. The computer program can realize the above-mentioned projection control method after being loaded and executed by the computer.

BRIEF DESCRIPTION OF THE DRAWINGS

In order to more clearly describe the technical solutions in embodiments of the present disclosure or the existing technology, the drawings that need to be used in the description of embodiments or the existing technology are briefly described hereinafter. Obviously, the drawings in the following description are merely embodiments of the present disclosure. For those skilled in the art, other drawings may be obtained based on the provided drawings without creative work.

DETAILED DESCRIPTION

The technical solutions in embodiments of the present disclosure are clearly and completely described below in conjunction with the drawings in embodiments of the present disclosure. Obviously, described embodiments are only a part of embodiments of the present disclosure, rather than all embodiments. Based on embodiments in the present disclosure, all other embodiments obtained by those skilled in the art without creative work shall fall within the protection scope of the present disclosure.

The embodiments of the present disclosure provide method and apparatus for a projection control, and an electronic device.

If a user needs to project the multimedia data in the first electronic device to the second electronic device, the user may need to perform at least the following configuration operations. The user may configure a wireless network to which the first electronic device and the second electronic device are respectively connected, such that the wireless networks to which the first electronic device and the second electronic device are respectively connected may belong to a same wireless network (that is, the first electronic device and the second electronic device may be located in a same wireless local area network); then, the user may select the multimedia data to be screen-projected to the second electronic device from the first electronic device, and select the second electronic device from the screen-projection-capable devices searched by the first electronic device, such that it may realize the objective of wirelessly screen-projecting the multimedia data in the first electronic device to the second electronic device. During the screen projection process, the user may need to perform a large number of operations, which makes the screen projection more complicated.

Figure 1:
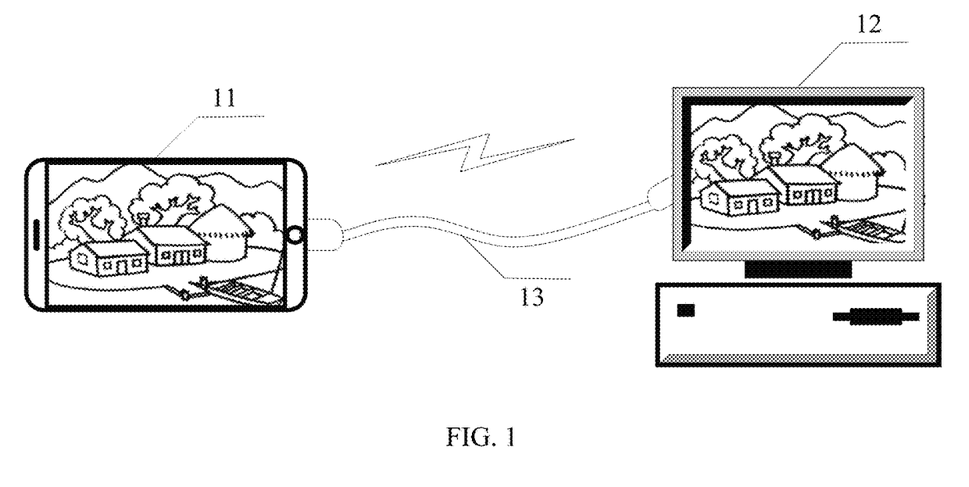
FIG. 1 illustrates a hardware architecture schematic according to various disclosed embodiments of the present disclosure.

FIG. 1 illustrates a hardware architecture schematic according to various disclosed embodiments of the present disclosure. The hardware architecture may include the first electronic device 11, the second electronic device 12, and a physical bus 13.

Exemplarily, the first electronic device 11 may be any electronic product that can interact with the user through one or more manners such as a keyboard, a touch pad, a touch screen, a remote control, a voice interaction, or a handwriting device. For example, the electronic product may be any one of a mobile phone, a laptop, a tablet computer, a handheld computer, a personal computer, a wearable device, a smart TV, a PAD, and the like.

Exemplarily, the first electronic device 11 may be a server, a server cluster including multiple servers, or a cloud computing server center.

Exemplarily, the second electronic device 12 may be any electronic product with a display screen, such as a mobile phone, a notebook computer, a tablet computer, a smart TV, a PAD, or the like.

Exemplarily, the second electronic device 12 may be any electronic product with a projection function, for example, a projector.

Exemplarily, the physical bus 13 may be a USB (universal serial bus) data line.

Exemplarily, the physical bus 13 may include at least two ports, where one port is connected to the first electronic device 11, and another port is connected to the second electronic device. Exemplarily, above-mentioned two ports may be same or different.

Exemplarily, any port included in the physical bus 13 may be a USB port, for example, any one of a Type-C port, a Type-B port, and a Type-A port.

If the first electronic device 11 needs to screen-project multimedia data to the second electronic device 12, the physical bus 13 may be used to connect the first electronic device 11 with the second electronic device 12, as shown in FIG. 1.

If the first electronic device 11 and the second electronic device 12 are connected through the physical bus 13, it is considered that the first electronic device 11 may have a screen projection need to the second electronic device or the second electronic device 12 may have a screen projection need to the first electronic device 11. Whether the first electronic device screen-projects to the second electronic device or the second electronic device is screen-projected to the first electronic device may be determined based on various manners. The following five manners are provided in embodiments of the present disclosure, which are not be limited in the present disclosure. The following five manners are all described from the side of the first electronic device. The determination manner on the side of the second electronic device may be same as the determination manner on the side of the first electronic device, which may not be described in detail herein.

For the first manner, after the first electronic device 11 and the second electronic device 12 are connected through the physical bus 13, the first electronic device 11 may determine its own screen projection attribute, and obtain the screen projection attribute of the second electronic device 12 through the physical bus. If the screen projection attribute of the first electronic device is the screen projection sender (that is, the sender of multimedia data) and the screen projection attribute of the second electronic device is the screen projection receiver (that is, the receiver of multimedia data), it may determine that the first electronic device may be screen-projected to the second electronic device; otherwise, the second electronic device may be screen-projected to the first electronic device.

For the second manner, after the first electronic device 11 and the second electronic device 12 are connected through the physical bus 13, the first electronic device 11 may obtain the display size of the second electronic device 12 through the physical bus. If it is detected that the size of the display screen of the second electronic device 12 is larger than its own display screen size, it may determine that the first electronic device may be screen-projected to the second electronic device; otherwise, the second electronic device may be screen-projected to the first electronic device.

For the third manner, after the first electronic device 11 and the second electronic device 12 are connected through the physical bus 13, the first electronic device 11 may obtain the function information of the second electronic device 12 through the physical bus. If it is detected that the function information of the second electronic device 12 includes projection, it may determine that the first electronic device may be screen-projected to the second electronic device.

For the fourth manner, after the first electronic device 11 and the second electronic device 12 are connected through the physical bus 13, the first electronic device 11 may display a user interface. The user interface may display information for characterizing whether the first electronic device is used as the screen projection sender, such that it may allow the user to choose whether to use the first electronic device 11 as the screen projection sender or the screen projection receiver.

For the fifth manner, if the physical bus contains two ports, one port is used to be connected to the screen projection sender, and one port is used to be connected to the screen projection receiver. If the multimedia data in the first electronic device needs to be screen-projected to the second electronic device, the port used to be connected to the screen projection sender in the physical bus may be connected to the first electronic device, and the port used to be connected to the screen projection receiver in the physical bus may be connected to the second electronic device. The first electronic device may detect the type of its connected port of the physical bus, that is, may determine that its own multimedia data needs to be screen-projected to the second electronic device.

In embodiments of the present disclosure, after the first electronic device 11 and the second electronic device 12 are connected through the physical bus 13, the screen projection between the first electronic device 11 and the second electronic device 12 may be realized. There is no need for the user to input relevant parameters required for screen projection on the first electronic device and/or the second electronic device and complete a series of configuration operations, such that the screen projection process is simple and the user operation is convenient.

Those skilled in the art should understand that above-mentioned electronic devices are only exemplary, and other existing or new electronic devices that are applicable to the present disclosure should also be included in the protection scope of the present disclosure and may be included in the present disclosure herein.

The screen projection control method provided by embodiments of the present disclosure is described in combination with above-mentioned hardware architecture.

Figure 2:
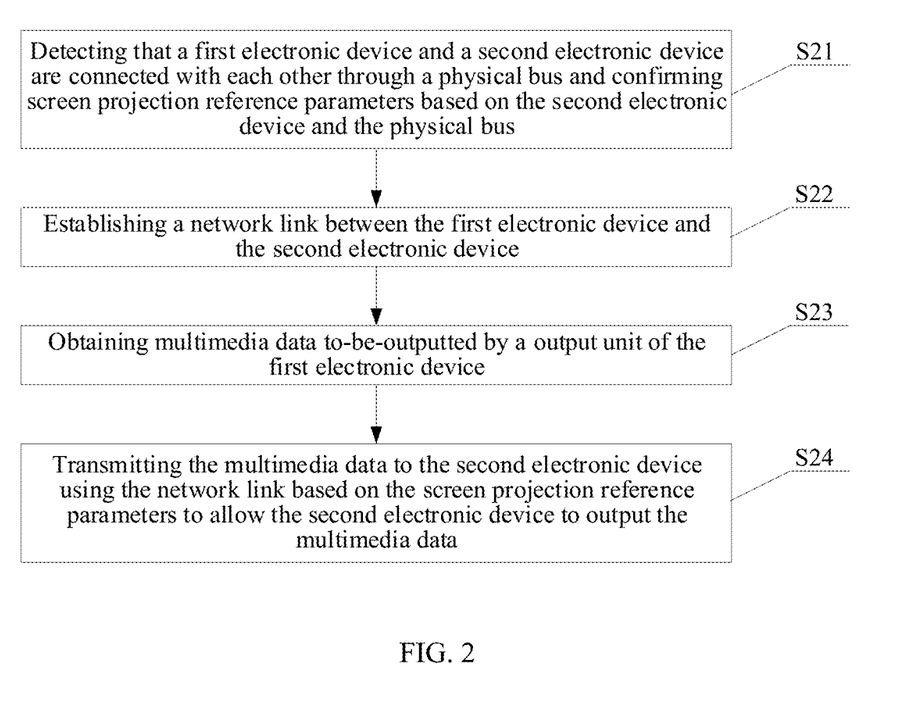
FIG. 2 illustrates a flowchart of a screen projection control method according to various disclosed embodiments of the present disclosure.

FIG. 2 illustrates a flowchart of a screen projection control method according to various disclosed embodiments of the present disclosure. The method may be applied to the first electronic device or the second electronic device. The method applied to the second electronic device is taken as an example for illustration. The method may include the following S21 to S24 in an implementation process.

At S21, it is detected that the first electronic device and the second electronic device may be connected through a physical bus, and the screen projection reference parameters may be confirmed based on the second electronic device and the physical bus.

It should be understood that the first electronic device and the second electronic device may transmit the screen projection reference parameters through the physical bus.

Exemplarily, the screen projection reference parameters may include, but not be limited to, at least one of resolutions, parameters of displayed images, code streams, decoding formats, the wireless network where the first electronic device is located, and the wireless network where the second electronic device is located.

At S22, a network link between the first electronic device and the second electronic device may be established.

In an optional implementation manner, at least a wireless network link between the first electronic device and the second electronic device may be established.

At S23, multimedia data to-be-outputted by the output unit of the first electronic device may be obtained.

Exemplarily, the output unit may include at least one of an audio output unit and an image output unit. Exemplarily, the image output unit may be a display, and the audio output unit may be a microphone.

Exemplarily, the multimedia data may include, but not limited to, at least one of text, sound, image, and video.

In an optional implementation manner, multiple ways may be used to obtain the multimedia data to-be-outputted by the output unit, and embodiments of the present disclosure may provide, but not limited to, following three manners.

For the first exemplary manner, all the data to-be-outputted by the output unit may be determined as multimedia data to be screen-projected to the second electronic device.

In the first manner, the user may not need to select the multimedia data to be transmitted to the second electronic device from the first electronic device.

For the second exemplary manner, from the data corresponding to the multiple applications to-be-outputted by the output unit, the data corresponding to the target application may be determined, and the data corresponding to the target application may be determined as the multimedia data to be screen-projected to the second electronic device.

Exemplarily, the target application may be an application running in the foreground in the first electronic device. For example, the application running in the foreground of the first electronic device is a video playback application or video player application, and the application running in the background is an instant messaging, such that the multimedia data corresponding to the target application may be video data and audio data corresponding to the video playback application. The multimedia data corresponding to the instant messaging application, such as text, may not be the multimedia data that needs to be screen-projected to the second electronic device. If the target application is an application running in the foreground in the first electronic device, the user may not need to select the multimedia data to be transmitted to the second electronic device from the first electronic device.

Exemplarily, the target application may be an application selected by the user. For example, the target application may be the application, selected by the user, to which the multimedia data that needs to be screen-projected to the second electronic device belongs based on the user interface displayed by the first electronic device.

For the third manner, the target data in the multiple data to-be-outputted by the output unit may be determined as the multimedia data to be screen-projected to the second electronic device.

Exemplarily, the target data may be multimedia data that the user selects from the first electronic device and needs to be screen-projected to the second electronic device. For example, the user may select a certain video from the user interface displayed in the first electronic device, and the video may be the target data.

At S24, the multimedia data may be transmitted to the second electronic device using the network link based on the screen projection reference parameter, such that the second electronic device may output the multimedia data.

In the screen projection control method provided by embodiments of the present disclosure, for the user, if the first electronic device needs to be screen-projected to the second electronic device, the first electronic device may be connected to the second electronic device by a physical bus, such that it may realize that the multimedia data in the first electronic device can be screen-projected to the second electronic device. After the first electronic device and the second electronic device are connected through the physical bus, the screen projection reference parameters may be automatically confirmed based on the physical bus, without requiring the user to configure the screen projection reference parameters on the first electronic device and/or the second electronic device. After the first electronic device and the second electronic device determine the screen projection reference parameters, a network link between the first electronic device and the second electronic device may be established. Therefore, based on the projection screen reference parameters and using the network link, the multimedia data in the first electronic device may be transmitted to the second electronic device, such that the second electronic device may output the multimedia data, which reduces the complexity of screen projection.

The implementation process of S22 may be described below. Various types may be used to implement S22. Embodiments of the present disclosure may provide, but not be limited to, following two types.

The implementation of the first-type S22 may include establishing a network link between the first electronic device and the second electronic device.

Exemplarily, the above-mentioned network link may be a wired network link established using the first-type network card on the first electronic device and the first-type network card on the second electronic device where the physical bus is used as a transmission medium; and the first-type of network card may be a network card adapted to the physical bus.

Exemplarily, the above-mentioned network link may be a wireless network link established using the second-type network on the second electronic device and the second-type network card on the first electronic device.

The network adapter may be commonly known as the network card, which realizes the network connection between the electronic device and the electronic device, and between the electronic device and the network device.

Exemplarily, the types of network cards may include wireless network cards and wired network cards.

Exemplarily, the first-type network card may be a wired network card. Exemplarily, the type of physical bus supported by the network card may be different, and the type of the network card may be different. The first-type of network card may belong to the network card type that supports the physical bus.

In one optional implementation manner, the implementation manner of establishing the wireless network link using the second-type network card on the first electronic device and the second-type network on the second electronic device may include the following A1 to A2.

At A1, if the first wireless network is different from the second wireless network, the wireless network where the second-type network card on the first electronic device is located may be switched to the second wireless network.

The second-type network card on the first electronic device may be in the first wireless network; the second-type network card on the second electronic device may be in the second wireless network.

If the first wireless communication network is different from the second wireless network, it indicates that the first electronic device and the second electronic device may be in different local area networks. The wireless network where the first electronic device is located may need to be switched to the second wireless communication network, such that the first electronic device and the second electronic device may be in a same local area network.

At A2, in the second wireless network, a wireless network link between the second-type network card on the second electronic device and the second-type network card on the first electronic device may be established.

The second implementation manner of S22 may include establishing two network links between the first electronic device and the second electronic device.

Exemplarily, two network links may respectively be a wired network link established using the first-type network card on the first electronic device and the first-type network card on the second electronic device, where the physical bus is used as a transmission medium, and the first-type of network card may be a network card adapted to the physical bus; and a wireless network link established using the second type network on the second electronic device through the second type network card on the first electronic device.

In an optional implementation manner, before establishing one or two network links between the first electronic device and the second electronic device, the method may also include respectively obtaining network connection reference information needed to establish one or two network links through the physical bus.

Exemplarily, the network connection reference information may include, but not be limited to, the communication address of the network card included in the first electronic device, and/or the communication address of the network card included in the second electronic device.

Exemplarily, the communication address of the network card may include at least one of an IP (Internet Protocol) address and a MAC (Media Access Control) address.

Exemplarily, establishing two network links between the first electronic device and the second electronic device may include, based on the network connection reference information needed for each network link, establishing two network links between the first electronic device and the second electronic device.

Exemplarily, A2 may include, for example, in the second wireless network, establishing a wireless network link based on the network connection reference information of the second type network card on the second electronic device and the network connection reference information of the second type network card on the first electronic device.

In the process of establishing a wireless network link, compared to searching the screen-projection-capable devices by the first electronic device in the existing technology, in embodiments of the present disclosure, it is considered that the second electronic device connected to the first electronic device may be the device that the first electronic device needs to be screen-projected, which may not need for the first electronic device to search and may not need for the user to select the second electronic device from the screen-projection-capable devices. In such way, the establishment of a wireless network link may be relatively fast and the screen projection process may be simplified.

Exemplarily, establishing a wired network link between the first electronic device and the second electronic device may include establishing a wired network link based on the network connection reference information of the first type network card on the second electronic device and the network connection reference information of the first type network card on the first electronic device.

In order for those skilled in the art to better understand the two types of network links established in embodiments of the present disclosure, the architecture of two types of network links is described hereinafter.

Figure 3:
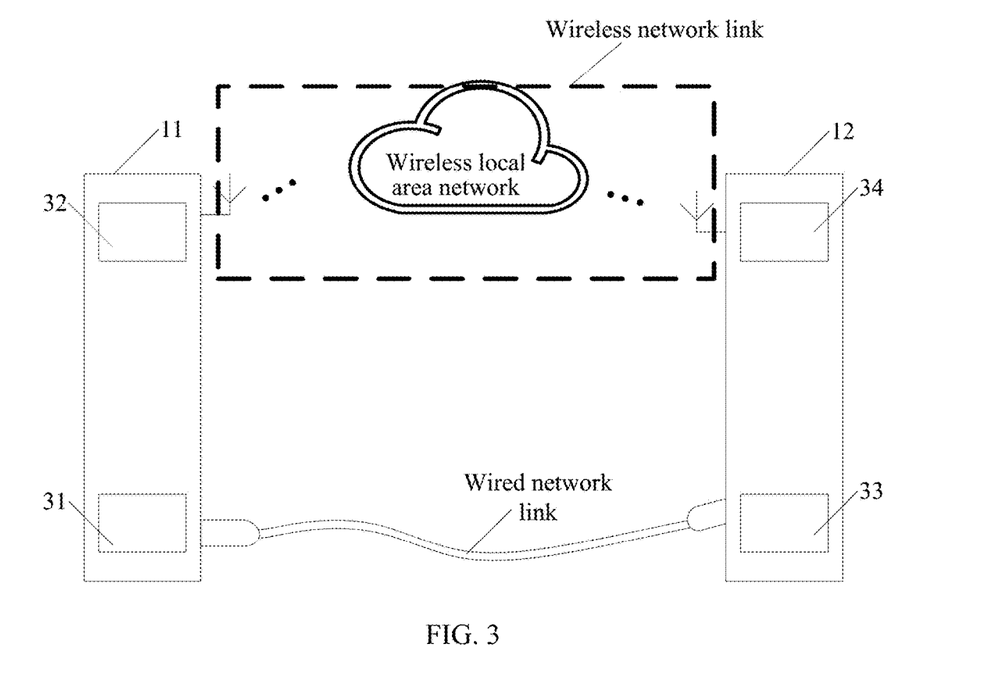
FIG. 3 illustrates a schematic of two network links according to various disclosed embodiments of the present disclosure.

FIG. 3 illustrates a schematic of two network links according to various disclosed embodiments of the present disclosure.

As shown in FIG. 3, the first electronic device 11 may include the first-type network card 31 and the second-type network card 32; and the second electronic device 12 may include the first-type network card 33 and the second-type network card 34.

Exemplarily, the second type network card 32, the second type network card 34, and the same wireless local area network where the first electronic device 11 and the second electronic device 12 are located may form a wireless network link.

Exemplarily, the first type network card 31, the first type network card 33, and the physical bus may form a wired network link.

It should be understood that if two network links are between the first electronic device and the second electronic device, then there are various manners for the first electronic device to transmit multimedia data to the second electronic device. Embodiments of the present disclosure may provide, but not be limited to, the following manner: using at least one of the two network links to transmit the multimedia data to the second electronic device. For example, three following manners may be included for the first electronic device to transmit multimedia data to the second electronic device.

For the first transmission manner, the first electronic device may use the wired network link to transmit the multimedia data to the second electronic device.

The first transmission method may be applied to the following scenarios.

For the first scenario, the physical bus connection may be maintained between the first electronic device and the second electronic device; however, a wireless network link connection may not be maintained between the first electronic device and the second electronic device.

At the first scenario, the first electronic device and the second electronic device may only transmit multimedia data through a wired network link.

For the second scenario, the physical bus connection may be maintained between the first electronic device and the second electronic device; and a wireless network link connection may be maintained between the first electronic device and the second electronic device.

Since the transmission speed of multimedia data through the wired network link is faster than the transmission speed of multimedia data through the wireless network link, the transmission delay of multimedia data through the wired network link may be relatively small. Since the wired network link is more stable than the wireless network link, Caton phenomenon may be less easily occurred when transmitting multimedia data through the wired network link.

In the second scenario, the wired network link may be preferentially used to transmit multimedia data.

For the second transmission manner, the first electronic device may use the wireless network link to transmit the multimedia data to the second electronic device.

The second transmission method may be applied to the following scenarios.

At the first scenario, the connection between the first electronic device and the second electronic device through the physical bus may be disconnected.

The physical bus is disconnected, such that the wired network link does not exist, and multimedia data can only be transmitted through the wireless network link.

At the second scenario, the physical bus connection may be maintained between the first electronic device and the second electronic device, and the wireless network link connection may be maintained between the first electronic device and the second electronic device.

It can be understood that although the wireless network link has various disadvantages compared to the wired network link, maintaining the wired network link may require that the first electronic device and the second electronic device are always connected to a physical bus. In a scenario where the first electronic device or the second electronic device may be moved at any time, the physical bus may be disconnected from the first electronic device and/or the second electronic device during the process of moving the first electronic device or the second electronic device, which may result in the interruption of multimedia data transmission. In order to avoid interruption of multimedia data transmission, wireless communication links may be used to transmit multimedia data.

Exemplarily, in a scenario where the first electronic device or the second electronic device may be moved at any time, if it is detected that the physical bus connection is maintained between the first electronic device and the second electronic device, transmitting multimedia data through the wireless network link may be switched to transmitting multimedia data through the wired network link; and if it is detected that the physical bus is disconnected between the first electronic device and the second electronic device, transmitting multimedia data through the wired network link may be switched to transmitting multimedia data through the wireless network link.

Exemplarily, the above-mentioned process may involve multiple switching between the wireless network link and the wired network link, which adds extra consumption to the first electronic device. Exemplarily, if the number of connection-disconnection times between the first electronic device and the second electronic device through the physical bus is detected to be greater than or equal to a threshold value of 1, it determines that the multimedia data may be preferably transmitted to the second electronic device through a wireless network link.

When the first electronic device transmits multimedia data to the second electronic device through the wired network link, the source address of the multimedia data may be the communication address of the network card of the first type in the first electronic device, and the destination address of the multimedia data may be the communication address of the network card of the first type in the second electronic device.

When the first electronic device transmits multimedia data to the second electronic device through the wireless network link, the source address of the multimedia data may be the communication address of the second type of network card in the first electronic device, and the destination address of the multimedia data may be the communication address of the second type of network card in the second electronic device.

When the first electronic device transmits multimedia data, in the process of switching from the wired network link to the wireless network link, or switching from the wireless network link to the wired network link, the first electronic device may need to switch the source address and the destination address.

For the third transmission method, the first electronic device may transmit the first part of the multimedia data to the second electronic device through the wired network link, and transmit the second part of the multimedia data through the wireless network link. The second part of data may be data other than the first part of data in the multimedia data.

The multimedia data may be divided into the first part of data and the second part of data, the first part of data may be transmitted through a wired network link, and the second part of data may be transmitted through a wireless network link. That is, the first part of data and the second part of data may be simultaneously transmitted, thereby increasing the transmission speed of multimedia data.

Exemplarily, when the data amount of multimedia data exceeds a set threshold, the third transmission manner may be used. If the data amount of multimedia data does not exceed a set threshold, the first transmission manner or the second transmission manner may be used.

Exemplarily, the set threshold may be determined based on actual conditions, which may not be limited herein.

In an optional implementation manner, the process of transmitting multimedia data from the first electronic device to the second electronic device may include the following B1 to B3.

At B1, it may detect whether the first electronic device and the second electronic device support multimedia data transmission using a display interface; if yes, execute B2; and if no, execute B3.

Exemplarily, the physical bus may include multiple transmission channels, and the multiple transmission channels may include the first transmission channel and the second transmission channel, where the first transmission channel may be used to transmit audio and/or video data, and the second transmission channel may be used to transmit USB data.

Exemplarily, the formats of the data transmitted by the first transmission channel and the second transmission channel may be different.

Exemplarily, the physical bus may include the second transmission channel, but may not include the first transmission channel.

If the physical bus includes the first transmission channel, and the first electronic device and the second electronic device support the transmission protocol corresponding to the first transmission channel, it is determined that "the first electronic device and the second electronic device support multimedia data transmission using a display interface".

If the physical bus does not include the first transmission channel, or the first electronic device and the second electronic device do not support the transmission protocol corresponding to the first transmission channel, it is determined that "the first electronic device and the second electronic device do not support multimedia data transmission using a display interface".

At B2, the multimedia data may be transmitted to the second electronic device through the physical bus based on the display interface on the first electronic device.

If the multimedia data includes audio and/or video data, since the quality of the audio and/or video data transmitted through the first transmission channel is higher than the quality of the audio and/or video data transmitted through the second transmission channel, exemplarily, in the case of "the first electronic device and the second electronic device support multimedia data transmission using a display interface", B2 may be executed first. That is, multimedia data may be transmitted through the first transmission channel.

Exemplarily, in the process of transmitting multimedia data through the first transmission channel, it does not need to be based on the projection screen reference parameters; however, in both the process of transmitting multimedia data through the second transmission channel and the process of transmitting multimedia data through the wireless network link, it needs to be based on the projection screen reference parameters. That is, the switching speed between the second transmission channel and the wireless network link may be higher than the switching speed between the first transmission channel and the wireless network link.

If the wired network link and the wireless network link may be switched multiple times, in order to increase the switching speed, in the case of "the first electronic device and the second electronic device support multimedia data transmission using a display interface", step B3 may also be executed preferentially.

At B3, based on the screen projection reference parameters, using the network link, the multimedia data may be transmitted to the second electronic device.

In order for those skilled in the art to have a better understanding of the methods mentioned in step B1 to step B3 provided in the embodiments of this application, the above-mentioned method is described hereinafter in combination with the structure of the first electronic device, the structure of the second electronic device, and the structure of the physical bus.

Figure 4:
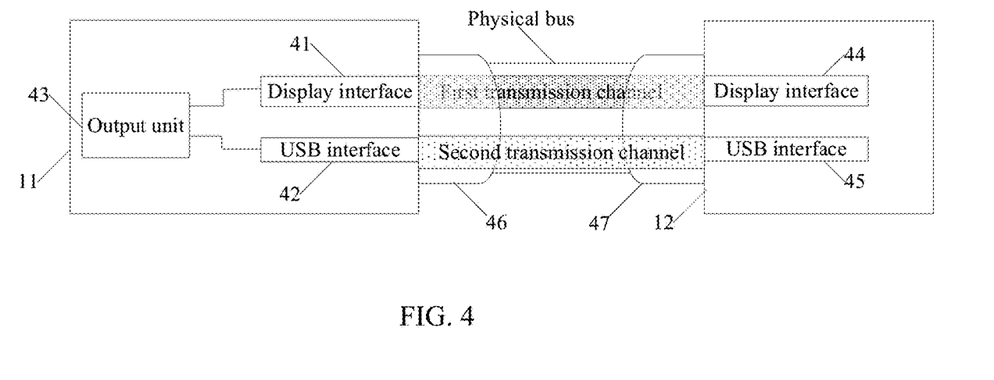
FIG. 4 illustrates a related hardware circuit diagram involved in transmitting multimedia data from a first electronic device to a second electronic device according to various disclosed embodiments of the present disclosure.

FIG. 4 illustrates a related hardware circuit diagram involved in transmitting multimedia data from a first electronic device to a second electronic device according to various disclosed embodiments of the present disclosure.

The structure of the first electronic device, the structure of the second electronic device, and the structure of the physical bus shown in FIG. 4 are only exemplary, which may not be limited in the present disclosure.

As shown in FIG. 4, the first electronic device 11 may include a display interface 41, a USB (universal serial bus) interface 42 and an output unit 43. The multimedia data to-be-outputted by the output unit 43 may be transmitted to the display interface 41 or the USB interface 42.

Exemplarily, the display interface 41 may be a DP (display port), an HDMI (high-definition multimedia interface), a DVI (digital visual interface), a VGA (video graphics array) interface, or a USB interface with video transmission function. In some embodiments, when a USB interface with video transmission function is used, the display interface 41 and the USB interface 42 may be shown as one interface physically, such as a USB-Type C interface or a Thunderbolt interface.

The second electronic device 12 may include a display interface 44 and a USB (universal serial bus) interface 45.

The description of the display interface 44 should refer to the description of the display interface 41, which may not be described in detail herein. In some embodiments, when a USB interface with video transmission function is used, the display interface 44 and the USB interface 45 may physically be one interface, such as a USB-Type C interface or a Thunderbolt interface.

Exemplarily, the physical bus may include at least two ports, where the port 46 is connected to the first electronic device, and the port 47 is connected to the second electronic device.

The port 46 may include a connection point A connected to the display interface 41 and a connection point B connected to the USB interface 42. The port 47 may include a connection point C connected to the display interface 44 and a connection point D connected to the USB interface 45.

The display interface 41, the first transmission channel connecting the connection point A and the connection point C in the physical bus, and the display interface 44 may form a wired path between the first electronic device and the second electronic device.

The USB interface 42, the second transmission channel connecting the connection point B and the connection point D in the physical bus, and the USB interface 45 may form a wired network link between the first electronic device and the second electronic device.

The first electronic device may transmit multimedia data to the second electronic device via a wire; and the first electronic device may transmit multimedia data to the second electronic device via a wired network link.

In an optional implementation manner, S21 may be implemented by multiple implementation manners, and embodiments of the present disclosure may provide, but may not be limited to, the following manners. The manner may include detecting that the first electronic device and the second electronic device are connected by a physical bus that is consistent with the universal serial bus (USB) interface appearance standard.

Exemplarily, the first-type network card may be a USB-based network card.

Exemplarily, the physical bus conforming to the appearance standard of the universal serial bus USB interface may be a USB data line.

Types of physical buses that are consistent with the appearance standard of the universal serial bus USB interface may be multiple. Embodiments of the present disclosure may provide, but may not be limited to, the following two types, including the first physical bus type and the second physical bus type.

The physical bus belonging to the first physical bus type can only be used for screen projection; and the physical bus belonging to the second physical bus type can be used for screen projection, but also has other functions, such as charging.

Exemplarily, if the type of the physical bus connected between the first electronic device and the second electronic device is the first physical bus type, it is determined that a screen projection may be needed between the first electronic device and the second electronic device.

Exemplarily, it can be preset that in the first electronic device or the second electronic device, if it is connected to a physical bus belonging to the second physical bus type, the screen projection function may be defaulted. That is, if the type of the physical bus connected between the second electronic device and the second electronic device belongs to the second physical bus type, it is determined that the screen projection may be needed between the first electronic device and the second electronic device.

As disclosed above, whether the physical bus connected between the first electronic device and the second electronic device belongs to the first physical bus type or the second physical bus type, it is determined that the screen projection may be needed between the first electronic device and the second electronic device after the above-mentioned settings, as long as "it is detected that the first electronic device and the second electronic device are connected by a physical bus that conforms to the appearance standard of the Universal Serial Bus USB interface".

Exemplarily, if the type of the physical bus connected between the second electronic device and the second electronic device belongs to the second physical bus type, the user interface may be displayed on the first electronic device and/or the second electronic device. The user interface may display multiple functions corresponding to the physical bus, for example, screen projection or charging. If the user chooses to cast a screen, and it is determined that the screen needs to be cast between the first electronic device and the second electronic device, the step of "the screen projection reference parameters may be confirmed based on the second electronic device and the physical bus" may need to be executed.

Above-mentioned embodiments disclosed in the present disclosure describe the method in detail; and the method of the present disclosure may be implemented by various forms of apparatuses. Therefore, the present disclosure also provides a device, which may be described in detail with embodiments hereinafter.

Figure 5:
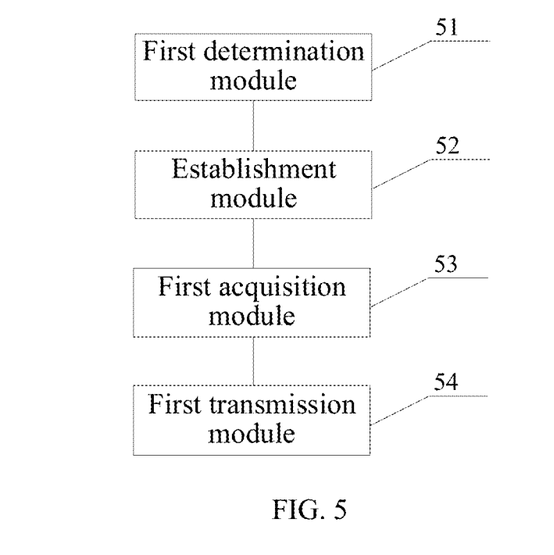
FIG. 5 illustrates a structural schematic of a screen projection control apparatus according to various disclosed embodiments of the present disclosure.

FIG. 5 illustrates a structural schematic of a screen projection control apparatus according to various disclosed embodiments of the present disclosure. The apparatus may include the first determination module 51, the establishment module 52, the first acquisition module 53, and the first transmission module 54.

The first determination module 51 may be configured to detect that the first electronic device and the second electronic device may be connected through a physical bus, and confirm the screen projection reference parameters based on the second electronic device and the physical bus.

The establishment module 52 may be configured to establish the network link between the first electronic device and the second electronic device.

The first obtaining module 53 may be configured to obtain the multimedia data to-be-outputted by the output unit of the first electronic device.

The first transmission module 54 may be configured to transmit the multimedia data to the second electronic device using the network link based on the screen projection reference parameter, such that the second electronic device may output the multimedia data.

In an optional implementation manner, the establishment module may include an establishment unit, configured to establish two network links between the first electronic device and the second electronic device; and the first transmission module may be configured to use at least one of the two network links to transmit the multimedia data to the second electronic device.

In an optional implementation manner, the establishment unit may include the first establishment subunit, configured to establish a wired network link using the physical bus as the transmission medium through the first-type network card on the first electronic device and the first-type network card on the second electronic device, where the first-type network card is a network card adapted to the physical bus; and include the second establishment subunit, configured to establish a wireless network link with the second type network on the second electronic device through the second type network card on the first electronic device.

In an optional implementation manner, the first transmission module may include the first transmission unit, configured to, if the physical bus connection is maintained between the first electronic device and the second electronic device, use the wired network link to transmit the multimedia data to the second electronic device data; and include the second transmission unit, configured to if the connection between the first electronic device and the second electronic device through the physical bus is disconnected, use the wireless network link to transmit the multimedia data to the second electronic device.

In an optional implementation, the first transmission module may include the third transmission unit, configured to transmit the first part of the multimedia data to the second electronic device through the wired network link if the data amount of the multimedia data exceeds a set threshold, and transmit the second part of data of the multimedia data through the wireless network link, where the second part of data is data other than the first part of data in the multimedia data.

In an optional implementation manner, the apparatus may also include the second obtaining module, configured to obtain respectively the network connection reference information required to establish the two types of network links through the physical bus. The establishment unit may be configured to establish two types of network links between the first electronic device and the second electronic device based on the network connection reference information required by each network link.

In an optional implementation manner, the apparatus may also include a detection module, configured to detect whether the first electronic device and the second electronic device support multimedia data transmission using a display interface and include the second transmission module, configured to, if the first electronic device and the second electronic device support multimedia data transmission using the display interface, transmit the multimedia data to the second electronic device through the physical bus based on the display interface on the first electronic device.

The first transmission module may be configured to, if the first electronic device and the second electronic device do not support multimedia data transmission using a display interface, transmit the multimedia data to the second electronic device using the network link based on the screen projection reference parameters.

In an optional implementation manner, the first determining module may be configured to detect that the first electronic device and the second electronic device are connected by a physical bus that conforms to the appearance standard of the universal serial bus USB interface; and the first-type network card It is a USB-based network card.

Figure 6:
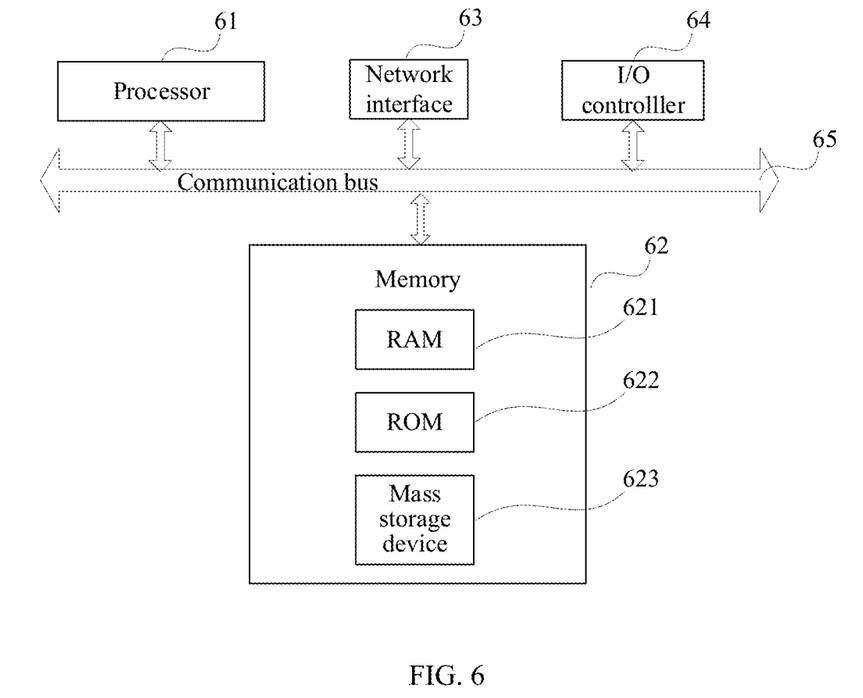
FIG. 6 illustrates a block diagram of an electronic device according to various disclosed embodiments of the present disclosure.

FIG. 6 illustrates a block diagram of an electronic device according to various disclosed embodiments of the present disclosure. Exemplarily, the electronic device may be a first electronic device or a second electronic device. The electronic device may include, but not be limited to, a processor 61, a memory 62, a network interface 63, an I/O controller 64, and a communication bus 65.

It should be noted that those skilled in the art can understand that the structure of the electronic device shown in FIG. 6 may not limit the electronic device, and the electronic device may include more or fewer components than shown in FIG. 6, or some combined components, or a different component arrangement.

The detailed description to each component of the electronic device is described in conjunction with FIG. 6 hereinafter.

The processor 61 may be the control center of the electronic equipment, which may use various interfaces and lines to connect various parts of the entire electronic device, and execute various functions and processing data of the electronic device by running or executing software programs and/or modules stored in the memory 62, and calling data stored in the memory 62, thereby monitoring the entire electronic device. The processor 61 may include one or more processing units. Exemplarily, the processor 61 may integrate an application processor and a modem processor. The application processor may mainly process the operating system, and user interface and application programs; and the modem processor may mainly process wireless communication.

It can be understood that the above-mentioned modem processor may not be integrated into the processor 61.

The processor 61 may be a central processing unit (CPU), or an ASIC (application specific integrated circuit), or one or more integrated circuits configured to implement embodiments of the present disclosure, and the like.

The memory 62 may include memory, such as a high-speed random access memory (RAM) 621 and a read-only memory (ROM) 622, and may also include a mass storage device 623, such as at least one magnetic disk memory and the like. Obviously, the electronic device may also include hardware required for other services.

The above-mentioned memory 62 may be configured to store the above-mentioned processor 61 executable instructions. The above-mentioned processor 41 may have the following functions that detecting that the first electronic device and the second electronic device may be connected through a physical bus, and confirming the screen projection reference parameters based on the second electronic device and the physical bus; establishing the network link between the first electronic device and the second electronic device; obtaining the multimedia data to-be-outputted by the output unit of the first electronic device; and transmitting the multimedia data to the second electronic device using the network link based on the screen projection reference parameter, such that the second electronic device may output the multimedia data.

A wired or wireless network interface 63 may be configured to connect the electronic device to the network.

The processor 61, the memory 62, the network interface 63, and the I/O controller 64 may be connected to each other through the communication bus 65. The communication bus may be an ISA (industry standard architecture) bus, a PCI (peripheral component interconnect) bus, an EISA (extended industry standard architecture) bus, or the like. The bus may be divided into an address bus, a data bus, a control bus, and the like.

In an exemplary embodiment, the electronic device may be implemented by one or more application-specific integrated circuits (ASIC), digital signal processors (DSP), digital signal processing devices (DSPD), programmable logic devices (PLD), field programmable Implementation of gate array (FPGA), controller, microcontroller, microprocessor or other electronic components, which is configured to perform the disclosed screen projection control methods.

In an exemplary embodiment, embodiments of the present disclosure provides a storage medium including instructions, such as a memory 62 including instructions, and the above-mentioned instructions may be executed by a processor 61 of an electronic device to complete the above-mentioned method. Optionally, the storage medium may be a non-transitory computer-readable storage medium, for example, the non-transitory computer-readable storage medium may be ROM, random access memory (RAM), CD-ROM, magnetic tape, floppy disk, optical data storage equipment, and the like.

In an exemplary embodiment, a computer-readable storage medium may also be provided, which can be directly loaded into the internal memory of the computer, such as the aforementioned memory 62, and contain software code or computer program. The computer program can realize the above-mentioned projection control method after being loaded and executed by the computer.

In an exemplary embodiment, a computer program product may also be provided, which can be directly loaded into the internal memory of the computer, such as the memory included in the electronic device, and contain software code.

The computer program can realize the above-mentioned projection control method after being loaded and executed by the computer.

Compared with the existing technology, the technical solutions provided by the present disclosure may achieve at least the following beneficial effects.

In the screen projection control method provided by embodiments of the present disclosure, for the user, if the first electronic device needs to be screen-projected to the second electronic device, the first electronic device may be connected to the second electronic device by a physical bus, such that it may realize that the multimedia data in the first electronic device can be screen-projected to the second electronic device. After the first electronic device and the second electronic device are connected through the physical bus, the screen projection reference parameters may be automatically confirmed based on the physical bus, without requiring the user to configure the screen projection reference parameters on the first electronic device and/or the second electronic device. After the first electronic device and the second electronic device determine the screen projection reference parameters, a network link between the first electronic device and the second electronic device may be established. Therefore, based on the projection screen reference parameters and using the network link, the multimedia data in the first electronic device may be transmitted to the second electronic device, such that the second electronic device may output the multimedia data, which reduces the complexity of screen projection.

Those skilled in the art may easily think of other embodiments of the present disclosure after considering the specification and practicing the invention disclosed herein. The present disclosure may be intended to cover any variations, uses or adaptations of the present disclosure; and these modifications, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are described by the following claims.

It should be understood that the present disclosure is not limited to the precise structure that has been described above and shown in the drawings, and various modifications and changes can be made without departing from the scope of the present disclosure. The scope of the present disclosure may only be limited by the appended claims.

What is claimed is:

1. A screen projection control method, comprising:
   detecting that a first electronic device and a second electronic device are connected with each other through a physical bus and confirming screen projection reference parameters based on the second electronic device and the physical bus, the screen projection reference parameters including, a wireless network that the first electronic device is located or a wireless network that the second electronic device is located;
   establishing a network link between the first electronic device and the second electronic device;
   obtaining multimedia data to-be-outputted by an output unit of the first electronic device; and
   transmitting the multimedia data to the second electronic device using the network link based on the screen projection reference parameters to allow the second electronic device to output the multimedia data.

2. The method according to claim 1, wherein:
   establishing the network link between the first electronic device and the second electronic device includes establishing two network links between the first electronic device and the second electronic device; and
   transmitting the multimedia data to the second electronic device using the network link includes transmitting the multimedia data to the second electronic device using at least one of the two network links.

3. The method according to claim 2, wherein establishing the two network links between the first electronic device and the second electronic device includes:
   establishing a wired network link using a first-type network card on the first electronic device and a first-type network card on the second electronic device, wherein the physical bus is used as a transmission medium, and the first-type of network card includes a network card adapted to the physical bus; and
   establishing a wireless network link using a second-type network on the second electronic device and a second-type network card on the first electronic device.

4. The method according to claim 3, wherein transmitting the multimedia data to the second electronic device using the at least one of the two network links includes:
   in response to a connection of the physical bus being maintained between the first electronic device and the second electronic device, using the wired network link to transmit the multimedia data to the second electronic device; and
   in response to the connection of the physical bus between the first electronic device and the second electronic device being disconnected, using the wireless network link to transmit the multimedia data to the second electronic device.

5. The method according to claim 2, wherein:
   before establishing the two network links between the first electronic device and the second electronic device, the method further includes respectively obtaining network connection reference information needed to establish the two network links through the physical bus; and
   establishing the two network links between the first electronic device and the second electronic device includes, based on the network connection reference information needed for each network link, establishing the two network links between the first electronic device and the second electronic device.

6. The method according to claim 1, wherein transmitting the multimedia data to the second electronic device using the at least one of the two network links includes:
   in response to data amount of the multimedia data exceeding a set threshold:
      transmitting a first part data of the multimedia data to the second electronic device through the wired network link, and
      transmitting a second part data of the multimedia data through the wireless network link, wherein the second part data includes data other than the first part data in the multimedia data.

7. The method according to claim 1, wherein:
   before transmitting the multimedia data to the second electronic device using the network link based on the screen projection reference parameters, the method further includes:
      detecting whether the first electronic device and the second electronic device support multimedia data transmission using a display interface; and
      in response to the first electronic device and the second electronic device supporting the multimedia data transmission using the display interface, transmitting the multimedia data to the second electronic device through the physical bus based on the display interface on the first electronic device; and transmitting the multimedia data to the second electronic device using the network link based on the screen projection reference parameters includes:

in response to the first electronic device and the second electronic device not supporting the multimedia data transmission using the display interface, transmitting the multimedia data to the second electronic device using the network link based on the screen projection reference parameters.

8. The method according to claim 1, wherein detecting that the first electronic device and the second electronic device are connected with each other through the physical bus includes:

detecting that the first electronic device and the second electronic device are connected with each other by a physical bus that is consistent with a universal serial bus (USB) interface appearance standard.

9. The method according to claim 1, wherein:

before transmitting the multimedia data to the second electronic device using the network link based on the screen projection reference parameters, the method further includes:

in response to the physical bus including a transmission channel for transmitting the multimedia data, and the first electronic device and the second electronic device supporting transmission protocol corresponding to the transmission channel of the physical bus, transmitting the multimedia data to the second electronic device through the physical bus; and transmitting the multimedia data to the second electronic device using the network link based on the screen projection reference parameters includes:

in response to the physical bus not including the transmission channel for transmitting the multimedia data, or at least one of the first electronic device or the second electronic device not supporting the transmission protocol corresponding to the transmission channel of the physical bus, transmitting the multimedia data to the second electronic device using the network link.

10. An electronic device, comprising:

a memory, configured to store program instructions for performing a screen projection control method; and a processor, coupled with the memory and, when the program instructions being executed, configured for:

detecting that a first electronic device and a second electronic device are connected with each other through a physical bus and confirming screen projection reference parameters based on the second electronic device and the physical bus, the screen projection reference parameters including, a wireless network that the first electronic device is located or a wireless network that the second electronic device is located;

establishing a network link between the first electronic device and the second electronic device;

obtaining multimedia data to-be-outputted by an output unit of the first electronic device; and transmitting the multimedia data to the second electronic device using the network link based on the screen projection reference parameters to allow the second electronic device to output the multimedia data.

11. The device according to claim 10, wherein:

establishing the network link between the first electronic device and the second electronic device includes establishing two network links between the first electronic device and the second electronic device; and transmitting the multimedia data to the second electronic device using the network link includes transmitting the multimedia data to the second electronic device using at least one of the two network links.

12. The device according to claim 11, wherein establishing the two network links between the first electronic device and the second electronic device includes:

establishing a wired network link using a first-type network card on the first electronic device and a first-type network card on the second electronic device wherein the physical bus is used as a transmission medium, and the first-type of network card includes a network card adapted to the physical bus; and establishing a wireless network link using a second-type network on the second electronic device and a second-type network card on the first electronic device.

13. The device according to claim 12, wherein transmitting the multimedia data to the second electronic device using the at least one of the two network links includes:

in response to a connection of the physical bus being maintained between the first electronic device and the second electronic device, using the wired network link to transmit the multimedia data to the second electronic device; and in response to the connection of the physical bus between the first electronic device and the second electronic device being disconnected, using the wireless network link to transmit the multimedia data to the second electronic device.

14. The device according to claim 11, wherein:

before establishing the two network links between the first electronic device and the second electronic device, the processor is further configured for respectively obtaining network connection reference information needed to establish the two network links through the physical bus; and establishing the two network links between the first electronic device and the second electronic device includes, based on the network connection reference information needed for each network link, establishing the two network links between the first electronic device and the second electronic device.

15. The device according to claim 10, wherein transmitting the multimedia data to the second electronic device using at least one of the two network links includes:

in response to data amount of the multimedia data exceeding a set threshold, transmitting a first part data of the multimedia data to the second electronic device through the wired network link, and transmitting a second part data of the multimedia data through the wireless network link, wherein the second part data includes data other than the first part data in the multimedia data.

16. The device according to claim 10, wherein detecting that the first electronic device and the second electronic device are connected with each other through the physical bus includes:

detecting that the first electronic device and the second electronic device are connected with each other by a physical bus that is consistent with a universal serial bus (USB) interface appearance standard.

17. A non-transitory computer-readable storage medium, containing computer program for, when executed by a processor, performing a screen projection control method, the method comprising:
- detecting that a first electronic device and a second electronic device are connected with each other through a physical bus and confirming screen projection reference parameters based on the second electronic device and the physical bus, the screen projection reference parameters including, a wireless network that the first electronic device is located or a wireless network that the second electronic device is located;
- establishing a network link between the first electronic device and the second electronic device;
- obtaining multimedia data to-be-outputted by an output unit of the first electronic device; and
- transmitting the multimedia data to the second electronic device using the network link based on the screen projection reference parameters to allow the second electronic device to output the multimedia data.

18. The storage medium according to claim 17, wherein:
- establishing the network link between the first electronic device and the second electronic device includes establishing two network links between the first electronic device and the second electronic device; and
- transmitting the multimedia data to the second electronic device using the network link includes transmitting the multimedia data to the second electronic device using at least one of the two network links.

19. The storage medium according to claim 18, wherein establishing the two network links between the first electronic device and the second electronic device includes:
- establishing a wired network link using a first-type network card on the first electronic device and a first-type network card on the second electronic device wherein the physical bus is used as a transmission medium, and the first-type of network card includes a network card adapted to the physical bus; and
- establishing a wireless network link using a second-type network on the second electronic device and a second-type network card on the first electronic device.

20. The storage medium according to claim 19, wherein transmitting the multimedia data to the second electronic device using the at least one of the two network links includes:
- in response to a connection of the physical bus being maintained between the first electronic device and the second electronic device, using the wired network link to transmit the multimedia data to the second electronic device; and
- in response to the connection of the physical bus between the first electronic device and the second electronic device being disconnected, using the wireless network link to transmit the multimedia data to the second electronic device.

* * * * *